(12) United States Patent
Hatakeyama (10) Patent No.: US 7,856,102 B2
(45) Date of Patent: Dec. 21, 2010

(54) METHODS AND APPARATUS FOR PROVIDING A MESSAGE AUTHENTICATION CODE USING A PIPELINE

(75) Inventor: Akiyuki Hatakeyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1281 days.

(21) Appl. No.: 11/347,066

(22) Filed: Feb. 3, 2006

(65) Prior Publication Data
US 2006/0245588 A1    Nov. 2, 2006

Related U.S. Application Data

(60) Provisional application No. 60/650,480, filed on Feb. 7, 2005.

(51) Int. Cl.
*H04K 1/04* (2006.01)
(52) U.S. Cl. ........................................ 380/37
(58) Field of Classification Search ............. 380/2–269; 713/176, 179, 181
See application file for complete search history.

(56) References Cited

U.S. PATENT DOCUMENTS

| | | | |
|---|---|---|---|
| 5,673,318 A * | 9/1997 | Bellare et al. ................ | 713/170 |
| 5,757,913 A * | 5/1998 | Bellare et al. ................ | 713/168 |
| 6,704,871 B1 * | 3/2004 | Kaplan et al. ................ | 713/192 |
| 7,181,009 B1 * | 2/2007 | Huxel ........................... | 380/28 |
| 7,249,255 B2 * | 7/2007 | Anand .......................... | 713/168 |
| 7,428,305 B1 * | 9/2008 | Hawkes et al. ................ | 380/28 |
| 7,492,894 B2 * | 2/2009 | Kitani et al. .................... | 380/37 |
| 7,526,085 B1 * | 4/2009 | Bong ............................. | 380/37 |
| 2001/0033656 A1 * | 10/2001 | Gligor et al. ................... | 380/28 |
| 2001/0046292 A1 * | 11/2001 | Gligor et al. ................... | 380/37 |
| 2002/0001384 A1 * | 1/2002 | Buer et al. ..................... | 380/30 |
| 2003/0007636 A1 * | 1/2003 | Alves et al. .................... | 380/37 |
| 2007/0286416 A1 * | 12/2007 | Bertoni et al. ................. | 380/37 |

FOREIGN PATENT DOCUMENTS

| | | |
|---|---|---|
| EP | 1 161 027 A1 | 12/2001 |
| JP | 6350222 A | 3/1988 |

OTHER PUBLICATIONS

Bruce Schneier (Text Book: Applied Cryptography, Second Edition Protocols Algorithm and Source Code in C, Second Editiion, pp. 30-31, 189-212, and 456.*
International Search Report and Written Opinion based on PCT/JP2006/302094, dated Jul. 26, 2006, 11 pgs.
Schneier B.; "One Way Hash Functions;" Applied Cryptography, XX, XX, 1996, pp. 30-31, 189-212, 456.
Japanese Office Action for corresponding Japanese Application JP 2006-021521, Jun. 23, 2009.
Japanese Office Action for corresponding Japanese Application JP 2006-021521, Mar. 9, 2010.

* cited by examiner

*Primary Examiner*—Keveh Abrishamkar
*Assistant Examiner*—Abdullah Almamun
(74) *Attorney, Agent, or Firm*—Matthew B. Dernier, Esq.; Gibson & Dernier LLP

(57) ABSTRACT

Methods and apparatus provide for: dividing a quantity of data values into a plurality of blocks; dividing the plurality of blocks into respective sub-sets of blocks; computing an intermediate message authentication code block for each sub-set of blocks by performing a first cipher block chaining algorithm on the blocks of each sub-set of blocks; and computing a message authentication code block for the plurality of blocks by performing a second cipher block chaining algorithm on the intermediate message authentication code blocks.

31 Claims, 7 Drawing Sheets

METHODS AND APPARATUS FOR PROVIDING A MESSAGE AUTHENTICATION CODE USING A PIPELINE

CROSS REFERENCE TO RELATED APPLICATION

This application claims the benefit of U.S. Provisional Patent Application No. 60/650,480, filed Feb. 7, 2005, entitled "Methods And Apparatus For Providing A Message Authentication Code Using A Pipeline," the entire disclosure of which is hereby incorporated by reference.

BACKGROUND OF THE INVENTION

The present invention relates to methods and apparatus for providing a cipher block chaining algorithm that produces a message authentication code, which may be executed on, for example, a pipelined processing system.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. These parallel processing systems may be adapted to form pipeline processors that perform repetitive processing algorithms in parallel. This is often useful in hiding algorithm and instruction latencies.

While pipeline processing is a desirable configuration, it is not always possible to efficiently process data through a pipeline. For example, a cipher block chaining algorithm that produces a message authentication code cannot be efficiently executed on a pipelined system. This is so because the processing stages in the chain depend on the data produced by previous stages and, therefore, the stages cannot be easily executed by separate pipelines.

Figure 1:
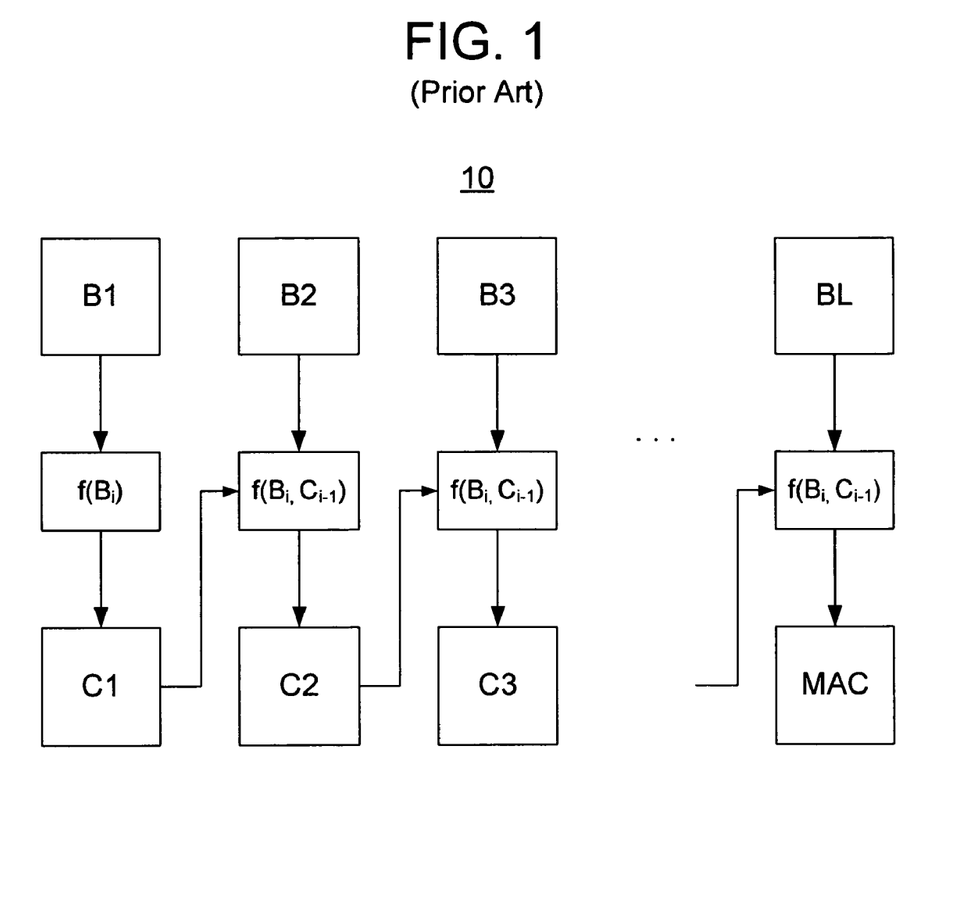
FIG. 1 is a block diagram illustrating the structure of a cipher block chaining algorithm in accordance with the prior art.

For Example, with reference to FIG. 1, a cipher block chaining algorithm that produces a message authentication code (MAC) is illustrated in which a plurality of blocks of data, Bi, may be encoded to produce a message authentication code (MAC). In a first stage of the cipher block chaining algorithm, a first block of data B1 is subjected to a cipher function $f(B_i)$ to produce a first cipher block C1. In the next stage of the cipher block chaining algorithm, a second block of data B2 is subjected to another cipher function $f(B_i, C_{i-1})$ to produce a second cipher block C2. It is noted that the cipher function of the second stage receives two inputs, namely, the second block of data B2 and the cipher block C1 of the previous stage. Thus, the second cipher block C2 is a function of the cipher block C1 of the previous stage. Subsequent stages of the cipher block chaining algorithm are substantially similar to the second stage, where the last stage of the cipher block chaining algorithm produces the MAC.

Figure 2:
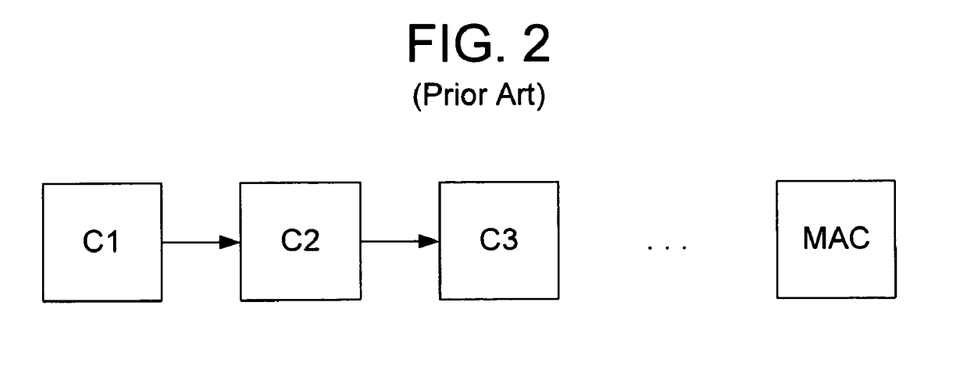
FIG. 2 is a block diagram illustrating the data dependencies of the cipher block chaining algorithm of FIG. 1 in accordance with the prior art.

With reference to FIG. 2, each of the cipher blocks Ci is dependant upon on a corresponding block of data $B_i$ and (with the exception of the first cipher block) a previous cipher block. Thus, any change to the blocks of data Bi will change the MAC. This provides a mechanism for authenticating the blocks of data Bi. Indeed, the MAC acts as a cryptographic checksum (or hash result) that is assigned to the data and used to test the data at a later date to verify that the data has not been maliciously changed. Without knowing the cipher block chaining algorithm that was used to create the MAC, it is highly unlikely that an unauthorized person would be able to change the data Bi without inadvertently changing the MAC. Thus, the MAC has value in the transmission of the data and/or storage of the data to insure that malicious tampering does not go undetected.

Unfortunately, the cipher block chaining algorithm described hereinabove is not suitable for pipeline processing because each stage of the algorithm depends on the cipher block produced in the previous stage. Accordingly, the stages may not be readily assigned to respective pipelines and executed in parallel. Consequently, the algorithm latency and instruction latency (associated with the given processor(s) executing the cipher block chaining algorithm) may not be hidden. Further, the authentication of the data Bi utilizing the MAC may become a significant bottleneck in a later-performed process.

Accordingly, there are needs in the art for new methods and apparatus for providing a cipher block chaining algorithm that produces a message authentication code, which may be executed on, for example, a pipelined processing system.

SUMMARY OF THE INVENTION

Aspects of the invention are directed to methods and apparatus for providing a cipher block chaining algorithm in which the chain is divided into a plurality of segments, such as four segments. Unlike the prior art process described above, where the end of the chain was the MAC, each segment produces an intermediate cipher block Mj, which is only dependent on a subset of the data blocks Bi. Since the dependency is limited, the Mj may be obtained through pipelining. In order to obtain a MAC, the Mj are subject to the XOR and encryption steps to obtain a single cipher block that is dependent on all data blocks Bi.

In accordance with one or more aspects of the present invention, methods and apparatus provide for: dividing a quantity of data values into a plurality of blocks; dividing the plurality of blocks into respective sub-sets of blocks; computing an intermediate message authentication code block for each sub-set of blocks by performing a first cipher block chaining algorithm on the blocks of each sub-set of blocks; and computing a message authentication code block for the plurality of blocks by performing a second cipher block chaining algorithm on the intermediate message authentication code blocks.

The first cipher block chaining algorithm may include a plurality of data conversion stages, each stage receiving a given block of the data values and producing a corresponding cipher block for the given stage; and a last stage of the first cipher block chaining algorithm may produce the intermediate message authentication code block for each sub-set of blocks.

Preferably, each stage of the first cipher block chaining algorithm is executed in a separate pipeline.

By way of example, a first stage of the first cipher block chaining algorithm may perform an encryption algorithm on the given block of data values to produce the corresponding cipher block; and subsequent stages of the first cipher block chaining algorithm may each perform an exclusive OR operation using the cipher block of the previous stage and the given block of data values followed by an encryption algorithm to produce the corresponding cipher block for the given stage.

Further, the second cipher block chaining algorithm may include a plurality of data conversion stages, each stage receiving a given one of the intermediate message authentication code blocks and producing a corresponding cipher block for the given stage. The last stage of the second cipher block chaining algorithm preferably produces the message authentication code block for the plurality of blocks.

In accordance with one or more further aspects of the present invention, methods and apparatus provide for: dividing a quantity of data values into a plurality of blocks; dividing the plurality of blocks into respective sets of blocks; dividing each set of blocks into respective sub-sets of blocks; computing an intermediate Message authentication code block for each sub-set of blocks by performing a first cipher block chaining algorithm on the blocks of each sub-set of blocks; and computing a message authentication code block for the plurality of blocks by performing a second cipher block chaining algorithm on the intermediate message authentication code blocks.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 3:
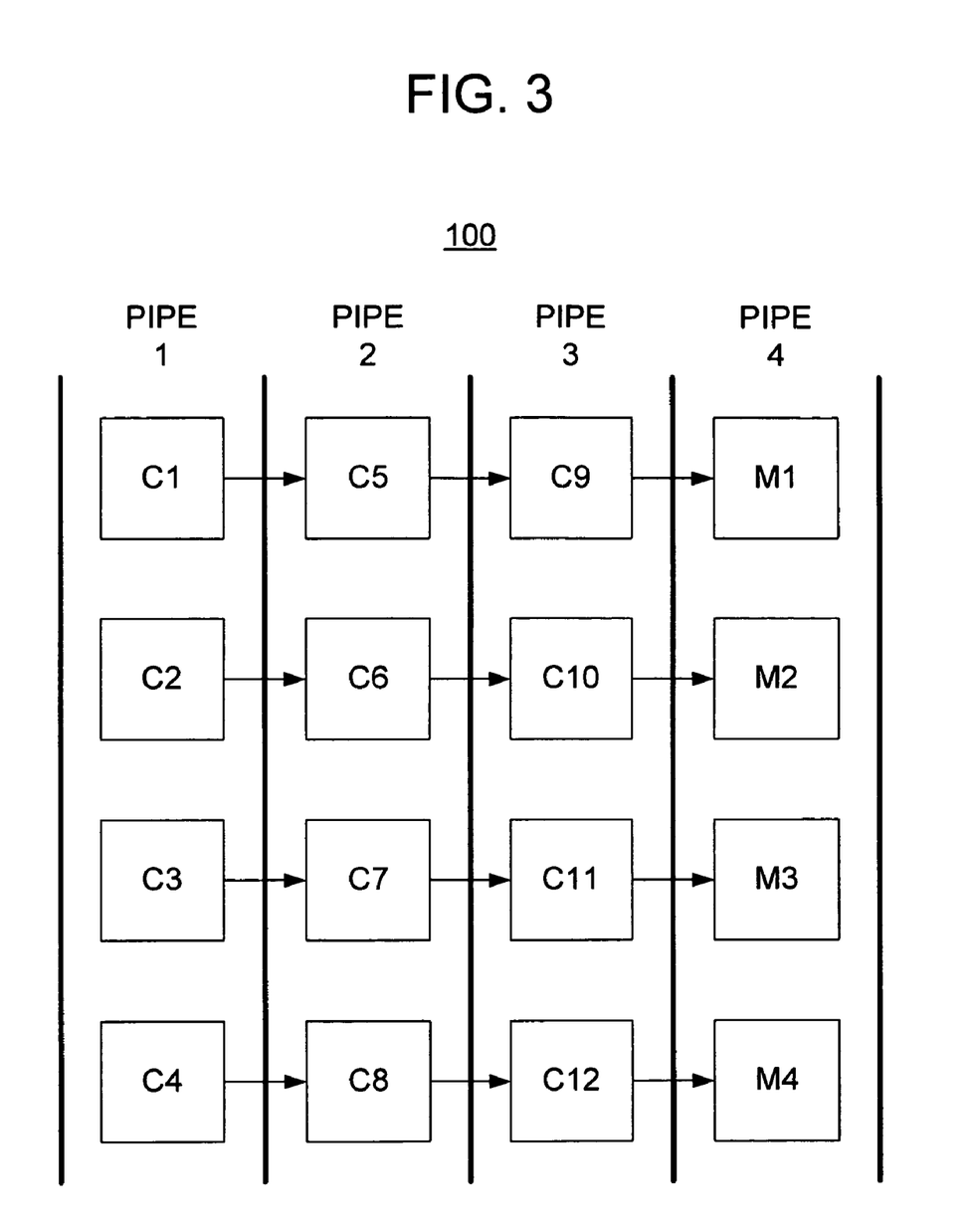
FIG. 3 is a block diagram illustrating a pipeline processor configuration that is operable to carry out a cipher block chaining algorithm in accordance with one or more aspects of the present invention.

With reference to the drawings, wherein like numerals indicate like elements, there is shown in FIG. 3 a block diagram illustrating a pipeline processor configuration 100 that is operable to carryout a cipher block chaining algorithm in accordance with one or more aspects of the present invention. The cipher block chaining algorithm is preferably configured such that only a limited set of cipher blocks Ci are dependant on one another in order to produce respective intermediate message authentication code blocks Mi. For example, if a plurality of data are organized into sixteen blocks of data Bi (i=1, 2, . . . 16), the cipher block chaining algorithm may be configured such that cipher blocks C1, C5, and C9 are dependant on one another to produce a first intermediate message authentication code block M1. Further, cipher blocks C2, C6, and C10 may be dependant upon one another to produce a second message authentication code block M2. Similar relationships may be established among the cipher blocks Ci to produce four sub-sets of cipher blocks having dependencies upon one another within the respective sub-set to produce corresponding intermediate message authentication code blocks Mi.

As there is not sequential dependency among all of the cipher blocks Ci, the cipher block chaining algorithm in accordance with aspects of the present invention may be performed by a pipeline process in which each pipeline performs one or more of the stages of the cipher block chaining algorithm. As shown in FIG. 3, a first pipeline may be operable to produce cipher blocks C1, C2, C3, and C4. A second pipeline may be operable to produce cipher blocks C5, C6, C7, and C8, it being noted that these cipher blocks are dependant on the cipher blocks of the prior pipeline, namely, C1, C2, C3, and C4. A third pipeline may be operable to produce the cipher blocks C9, C10, C11, and C12, again noting that these cipher blocks are dependant on prior cipher blocks. Finally, a fourth pipeline may be operable to produce the respective intermediate message authentication code blocks M1, M2, M3 and M4. It is noted that the number and extent of the pipelines is dependant on the extent of the data blocks and cipher blocks being produced, and further dependant on how these blocks are divided into sub-sets. Further details concerning how the data may be organized into sub-sets will be discussed in more detail hereinbelow.

Figure 4:
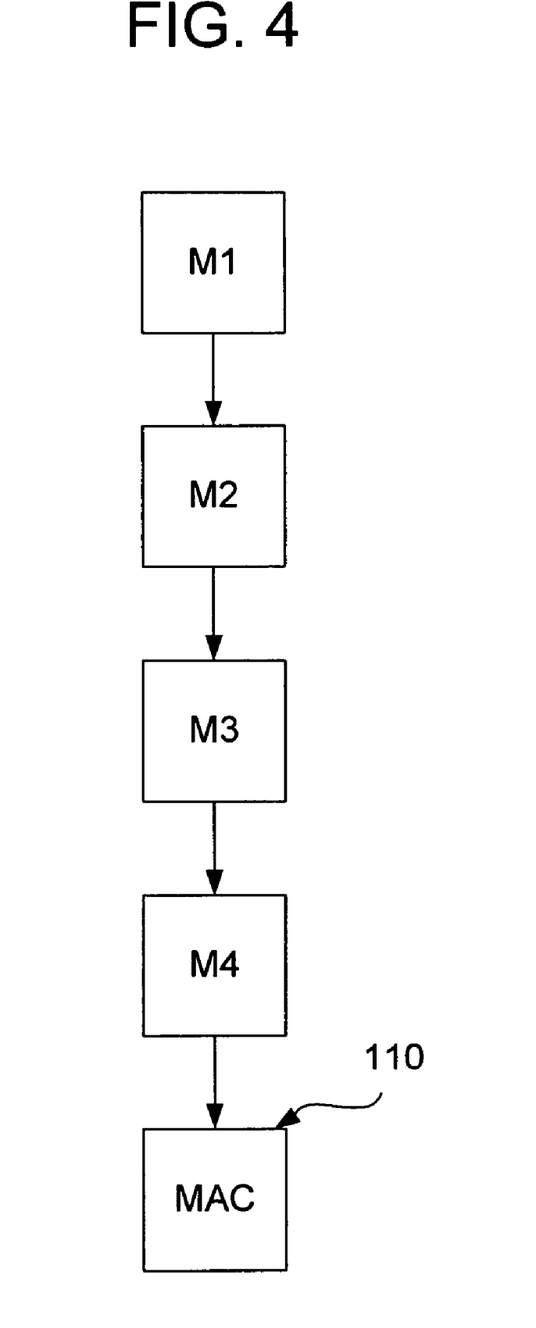
FIG. 4 is a block diagram illustrating processes in which the results of the cipher block chaining algorithm of FIG. 3 may be used to produce a message authentication code.

With reference to FIG. 4, a message authentication code block MAC 110 may be produced by performing a cipher block chaining algorithm on the intermediate message authentication code blocks Mi. Notably, any unauthorized change to the data Bi that produced the respective cipher blocks Ci and the respective intermediate message authentication code blocks Mi will necessarily change the data within the MAC 110, thereby making such unauthorized modification detectable.

Figure 5:
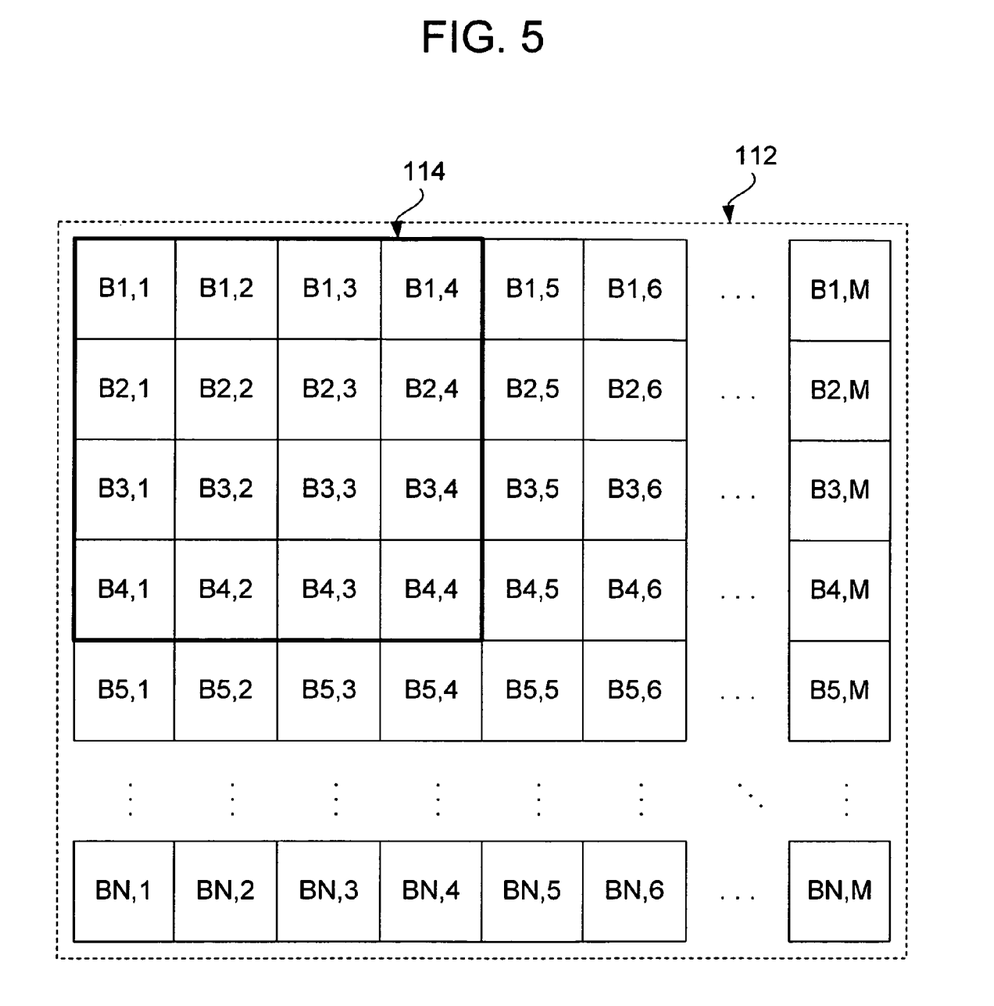
FIG. 5 is a conceptual diagram of a quantity of data that have been divided into a plurality of blocks, which have been grouped into a plurality of sets of blocks, each containing a plurality of sub-sets of blocks in accordance with one or more aspects of the present invention.

Reference in now made to FIG. 5, which is a conceptual diagram showing a quantity of data that may be subject to a cipher block chaining algorithm in accordance with one or more aspects of the present invention. As discussed hereinabove, the advantages of executing the cipher block chaining algorithm utilizing pipelines are achievable, in part, by dividing the data into a plurality of blocks Bi and subdividing the blocks Bi into respective sub-sets. As shown in FIG. 5, the data 112 may be of any size and divisible into any number of blocks Bi. The example discussed hereinabove with respect to FIGS. 3-4 assumed that the data have been divided into sixteen blocks Bi and subdivided into 4 sub-blocks. Thus, the example of FIG. 3 would represent a quantity of data corresponding in size to the set of blocks 114.

For the purposes of discussion, it is assumed that the extent of the data 112 includes only sixteen blocks $B_{i,j}$ (i=1, 2, 3, 4; and j=1, 2, 3, 4), then the blocks $B_{i,j}$ are preferably divided into respective sub-sets of blocks. For example, the sub-sets of blocks may be grouped in accordance with the index i into the following sub-sets: (B1,1; B1,2; B1,3; B1,4), (B2,1; B2,2; B2,3; B2,4), (B3,1; B3,2; B3,3; B3,4), and (B4,1; B4,2; B4,3; B4,4).

Figure 6:
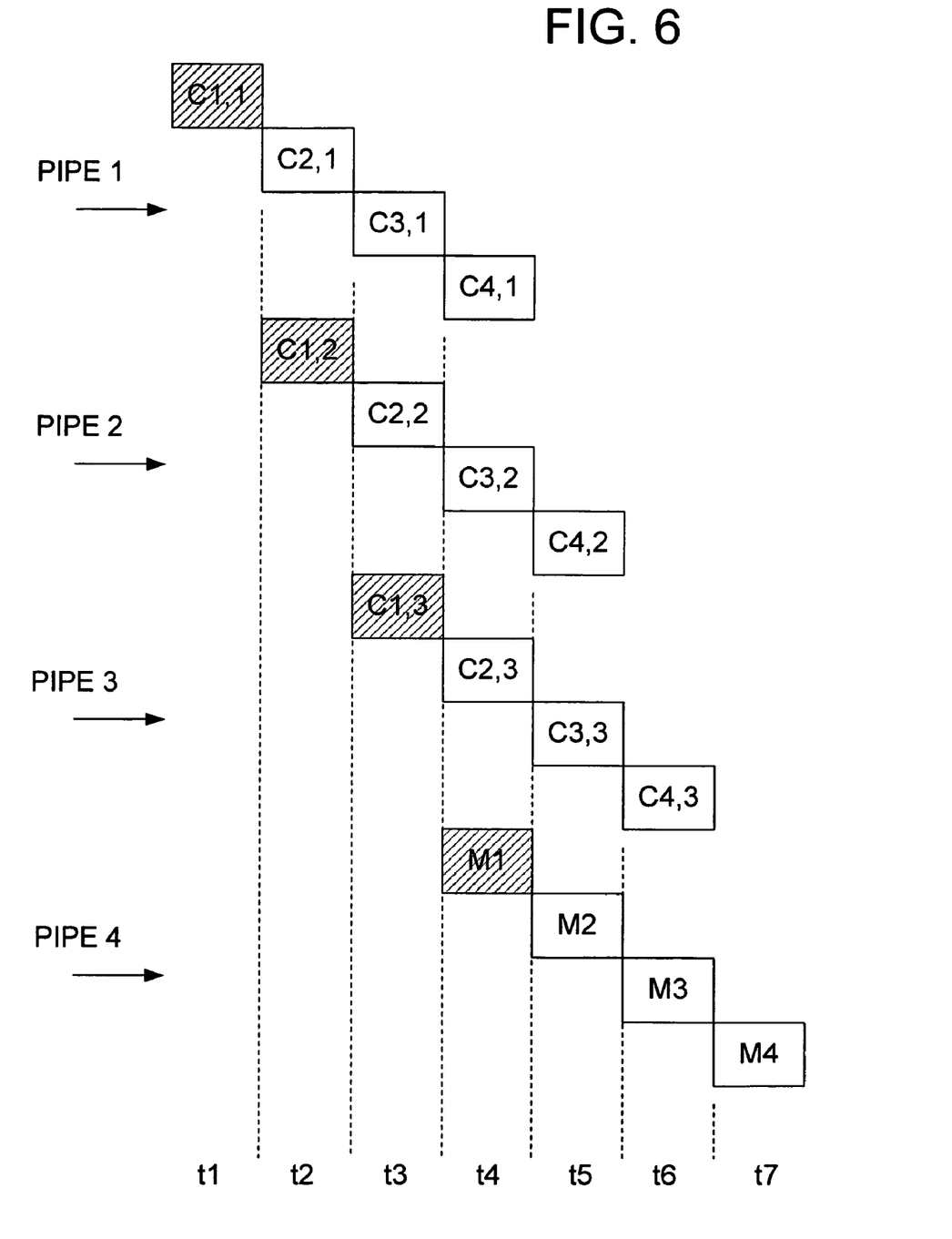
FIG. 6 is a conceptual block diagram illustrating sequences of data manipulations through a pipeline processor configuration that is operable to carry out the cipher block chaining algorithm of FIG. 3 in accordance with one or more aspects of the present invention.

Reference is now made to FIG. 6, which is a conceptual block diagram illustrating sequences of data manipulations through the plurality of pipelines in order to produce the respective cipher blocks $C_{i,j}$ and the intermediate message authentication codes Mi. Each of the pipelines is preferably operable to perform the data manipulations associated with a respective stage in the cipher block chaining algorithm. Thus, during a first time interval t1, the first pipeline may receive a first block B1,1 of the first sub-set of blocks and produce a corresponding cipher block C1,1.

In a second time interval t2, the first pipeline may receive a first block B2,1 from the second sub-set of blocks and produce a corresponding cipher block C2,1. During the same interval, the second pipeline may receive the second block of data B1,2 of the first sub-set of blocks and the cipher block C1,1 from the previous time interval and produce a corresponding cipher block C1,2.

In a third time interval t3, the first pipeline may receive a block of data B3,1 from the third sub-set of blocks to produce a corresponding cipher block C3,1. During the same time interval, the second pipeline may receive may receive a second block of data B2,2 from the second sub-set of data blocks and the cipher block C2,1 from the prior time interval and produce a corresponding cipher block C2,2. Further, the third pipeline may receive the third data block B1,3 from the first sub-set of blocks along with the cipher block C1,2 from the prior time interval to produce a corresponding cipher block C1,3.

In a forth time interval t4, the first pipeline may receive a first data block B4,1 from the fourth sub-set of blocks and produce a corresponding cipher block C4,1. In the same time interval, the second pipeline may receive a second block of data B3,2 from the third sub-set of blocks along with the cipher block C3,1 from the prior time interval to produce a corresponding cipher block C3,2. Further, the third pipeline may receive a third data block B2,3 from the second sub-set of blocks along with the cipher block C2,2 from the prior time interval and produce a corresponding cipher block C2,3. Still further, the forth pipeline may receive a forth data block B1,4 from the first sub-set of blocks along with the cipher block C1,3 from the prior time interval and produce a first intermediate message authentication code M1. This process repeats in subsequent time intervals until all of the intermediate message authentication code blocks M are obtained.

As may be noted from the illustration of FIG. 6, the respective cipher blocks C1,1; C1,2; and C1,3 are dependant on one another to produce the intermediate message authentication code M1. Similar associations may be understood as concerns the other sub-sets of blocks and corresponding intermediate message authentication code blocks M2, M3, and M4. Also, the use of the pipelines advantageously hides algorithm latencies and instruction latencies inasmuch as the pipelines may execute the respective stages of the cipher block chaining algorithm in parallel.

Referring again to FIG. 5, those skilled in the art will appreciate the extent of the data 112 may be such that the number of pipelines is insufficient to execute the cipher block chaining algorithm on all sub-sets of blocks in parallel. In such case, the blocks of data $B_{i,j}$ are preferably divided into respective sets of blocks 114, where each set includes a number of blocks of data $B_{i,j}$ corresponding with the number and extent of the pipelines. As discussed above, each set of blocks 114 is preferable divided into respective sub-sets of blocks as discussed hereinabove. Thus, the pipelines are preferably used to compute respective sets of intermediate message authentication code blocks M for each set of blocks 114. As the intermediate message authentication code blocks M become available, or after all have been computed, a message authentication code block for all of the blocks $B_{i,j}$ is preferably obtained by performing a cipher block chaining algorithm on the intermediate message authentication code blocks M.

Figure 7:
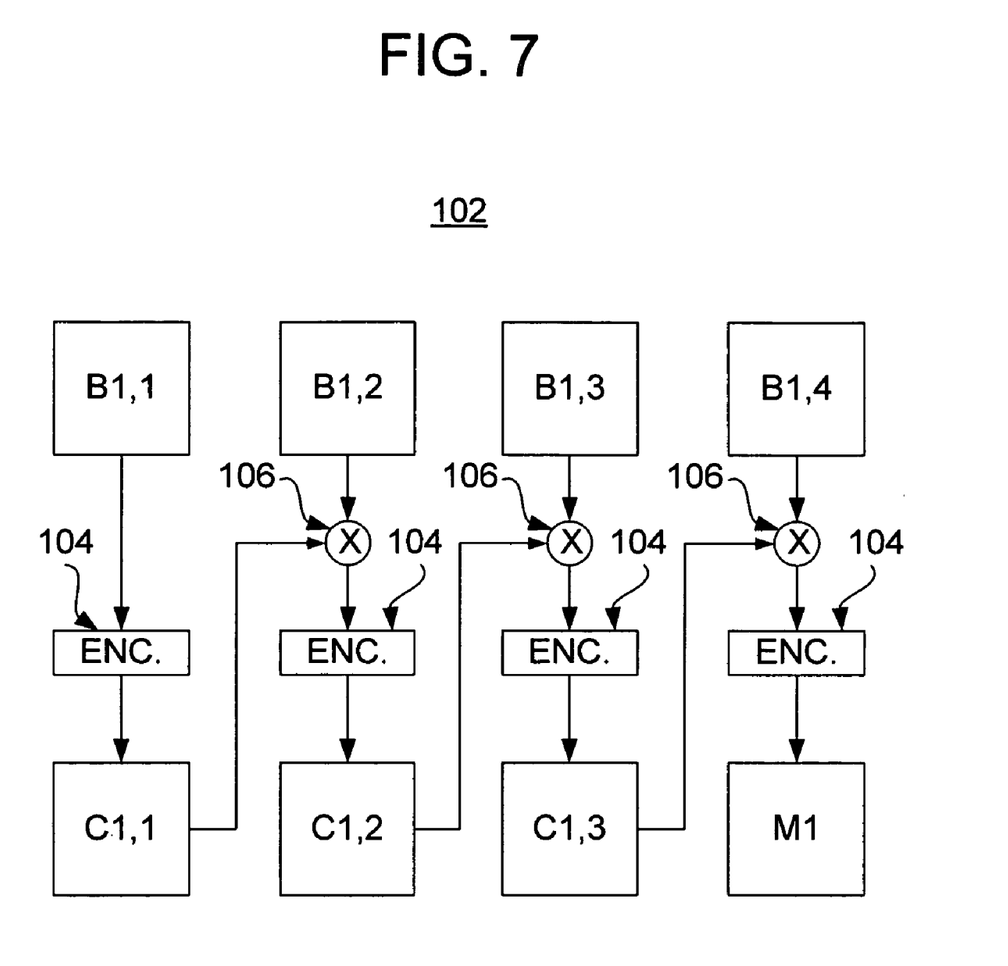
FIG. 7 is a block diagram illustrating further details concerning the cipher block chaining algorithm of FIG. 3 in accordance with one or more aspects of the present invention.

Reference is now made to FIG. 7, which illustrates an example of a cipher block chaining algorithm 102 suitable for use in accordance with one or more aspects of the present invention. The cipher block chaining algorithm 102 assumes that each sub-set of data blocks B include four data blocks and, therefore, the cipher block chaining algorithm includes four stages. By way of example, the first sub-set of data blocks B1,1; B1,2; B1,3; and B1,4 (FIG. 5) are assumed to be subject to the cipher block chaining algorithm 102. In a first stage of the algorithm, the first data block B1,1 is subject to an encryption algorithm 104 to produce the corresponding cipher block C1,1. In a second stage of the cipher block chaining algorithm, the second data block B1,2 and the cipher block C1,1 from the previous stage are subject to an exclusive OR operation (XOR) to produce an intermediate block of data. The intermediate block of data is subject to the encryption algorithm 104 to produce the corresponding cipher block C1,2. This process is repeated as to the subsequent data blocks B1,3 and B1,4 to produce the intermediate message authentication code block M1.

While the various embodiments and aspects of the present invention have been described hereinabove with respect to block diagrams and timing/sequence diagrams, one or more of the features of the present invention may be described mathematically. For example, the following variable definitions may be made to set up a mathematical illustration of an example cipher block chaining algorithm in accordance with the present invention:

| M: | message; |
| --- | --- |
| l(m): | message length (n bytes); |
| P: | depth of pipelining; |
| N: | nonce (16-n bytes); |
| R: | random value (16 * P bytes); and |
| MK: | encryption master key. |

With the variable definitions above, the example embodiment of the cipher block chaining algorithm in accordance with the present invention, including encryption, XOR and limited dependencies may be expressed as follows:

$$S[i]:=E(K, N\|i) \text{ for } i=0,\ldots,l(m);$$

$$C[i]:=M[i] XOR S[i] \text{ for } i=1,\ldots,l(m); \text{ and}$$

$$U:=T \text{ XOR } S[0],$$

where E(K, B) may be 128 bit block cipher encryption employing encryption B by Key K.

Once such a cipher block chaining algorithm is imposed upon a quantity of data to produce a MAC, such data may be authenticated in accordance with the following algorithm:

$K:=E(MK, R);$ $X[p]:=E(K, N\|l(m)+p)$ for $p=1, \ldots, P;$ $X[i+P]:=E(K, X[i] XOR\ M[i])$ for $i=1, \ldots, l(m);$ $X[i+P]:=E(K, X[i] XOR\ X[i+P-1])$ for $i=l(m)+1, \ldots, l(m)+P-1;$ and $T:=X[l(m)+P*2+1].$ As discussed above, the cipher block chaining techniques in accordance with one or more aspects of the present invention are preferably implemented utilizing pipeline processing technology. Among the ways in which pipeline technology may be implemented is the use of parallel processors. In this regard, reference is now made to FIG. 8, which illustrates a computing apparatus 200 that is suitable for carrying out the aspects of the invention discussed above. Preferably the apparatus 200 includes a plurality of processors 202A-D, associated local memories 204A-D, and a main memory (or shared memory) 206 interconnected by way of a bus 208. Although four processors 202 are illustrated by way of example, any number may be utilized without departing from the spirit and scope of the present invention.

Figure 8:
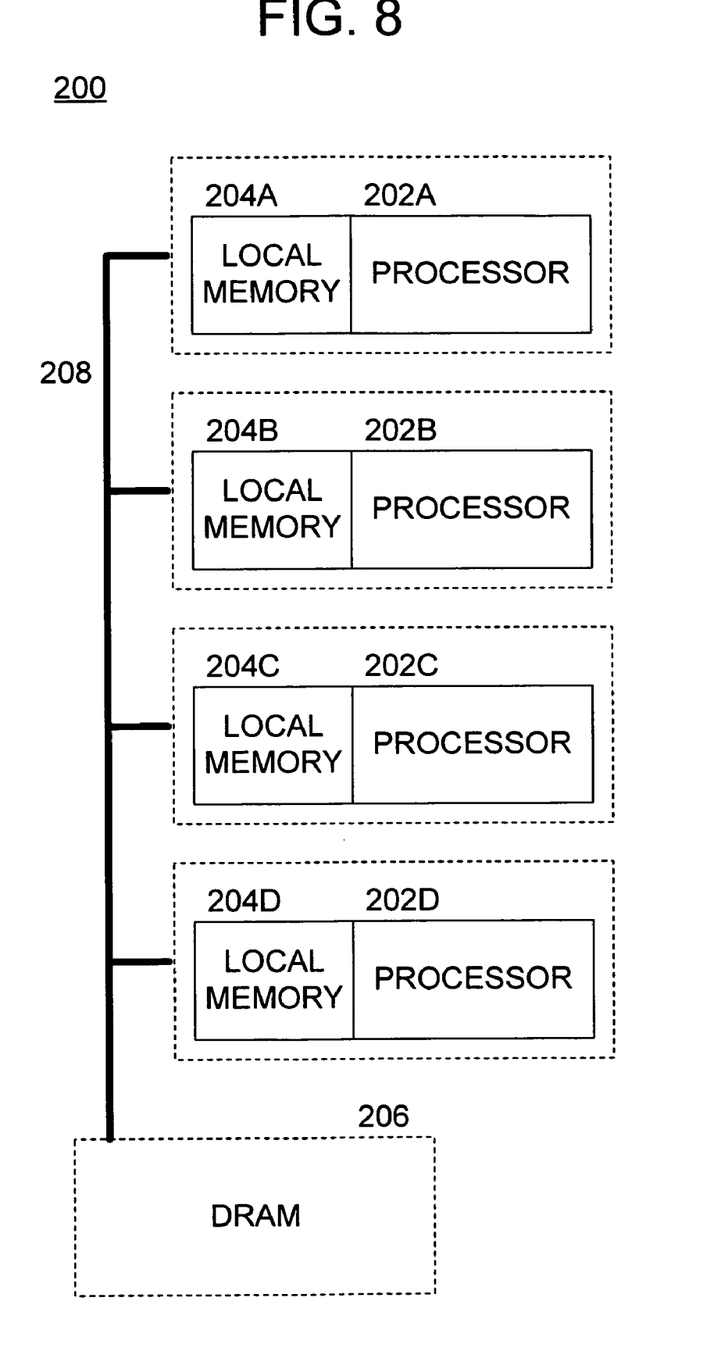
FIG. 8 is a block diagram illustrating the structure of a multi-processing system capable of carrying out the cipher block chaining algorithm of FIG. 7 in accordance with one or more aspects of the present invention.

The processors 202 may be implemented utilizing any of the known technologies that are capable of requesting data from the system memory 206, and manipulating the data to achieve a desirable result. Notably, the local memory 204 is preferably located in the same chip as the respective processor 202; however, the local memory 204 is preferably not a hardware cache memory in that there are preferably no on chip or off chip hardware cache circuits, cache registers, cache memory controllers, etc. to implement a hardware cache memory function. In alternative embodiments, the local memory 204 may be a cache memory and/or an additional cache memory may be employed. As on chip space is often limited, the size of the local memory 204 may be much smaller than the system memory 206. The processors 202 preferably provides data access requests to copy data (which may include program data) from the system memory 206 over the bus 208 into the respective local memories 204 for program execution and data manipulation. The mechanism for facilitating data access may be implemented utilizing any of the known techniques, such as direct memory access (DMA) techniques.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising the following steps to be executed by at least one computer processor:
   dividing a quantity of data values by the computer processor, into a plurality of blocks;
   dividing the plurality of blocks into respective sub-sets of blocks;
   computing an intermediate message authentication code block for each sub-set of blocks by performing a first cipher block chaining algorithm on the blocks of each sub-set of blocks; and
   computing a message authentication code block for the plurality of blocks by performing a second cipher block chaining algorithm on the intermediate message authentication code blocks.

2. The method of claim 1, wherein:
   the first cipher block chaining algorithm includes a plurality of data conversion stages, each stage receiving a given block of the data values and producing a corresponding cipher block for the given stage; and
   a last stage of the first cipher block chaining algorithm produces the intermediate message authentication code block for each sub-set of blocks.

3. The method of claim 2, further comprising executing each stage of the first cipher block chaining algorithm in a separate pipeline.

4. The method of claim 2, wherein:
   a first stage of the first cipher block chaining algorithm performs an encryption algorithm on the given block of data values to produce the corresponding cipher block; and
   subsequent stages of the first cipher block chaining algorithm each perform an exclusive OR operation using the cipher block of the previous stage and the given block of data values followed by an encryption algorithm to produce the corresponding cipher block for the given stage.

5. The method of claim 4, further comprising executing each stage of the first cipher block chaining algorithm in a separate pipeline.

6. The method of claim 2, wherein:
   the second cipher block chaining algorithm includes a plurality of data conversion stages, each stage receiving a given one of the intermediate message authentication code blocks and producing a corresponding cipher block for the given stage; and
   a last stage of the second cipher block chaining algorithm produces the message authentication code block for the plurality of blocks.

7. The method of claim 6, wherein:
   a first stage of the second cipher block chaining algorithm performs an encryption algorithm on the given block of data values to produce the corresponding cipher block; and
   subsequent stages of the second cipher block chaining algorithm each perform an exclusive OR operation using the cipher block of the previous stage and the given intermediate message authentication code block followed by an encryption algorithm to produce the corresponding cipher block for the given stage.

8. The method of claim 1, wherein the first and second cipher block chaining algorithms are the same.

9. A method, comprising the following steps to be executed by at least one computer processor:
dividing a quantity of data values by the computer processor into a plurality of blocks;
dividing the plurality of blocks into respective sets of blocks;
dividing each set of blocks into respective sub-sets of blocks;
computing an intermediate message authentication code block for each sub-set of blocks by performing a first cipher block chaining algorithm on the blocks of each sub-set of blocks; and
computing a message authentication code block for the plurality of blocks by performing a second cipher block chaining algorithm on the intermediate message authentication code blocks.

10. The method of claim 9, wherein:
the first cipher block chaining algorithm includes a plurality of data conversion stages, each stage receiving a given block of the data values and producing a corresponding cipher block for the given stage; and
a last stage of the first cipher block chaining algorithm produces the intermediate message authentication code block for each sub-set of blocks.

11. The method of claim 10, further comprising executing each stage of the first cipher block chaining algorithm in a separate pipeline.

12. An apparatus, comprising:
at least one memory circuit operable to store a quantity of data values that has been divided into a plurality of blocks and the plurality of blocks having been divided into respective sub-sets of blocks; and
at least one processor circuit operable to: (i) compute an intermediate message authentication code block for each sub-set of blocks by performing a first cipher block chaining algorithm on the blocks of each sub-set of blocks, and (ii) compute a message authentication code block for the plurality of blocks by performing a second cipher block chaining algorithm on the intermediate message authentication code blocks.

13. The apparatus of claim 12, wherein:
the first cipher block chaining algorithm includes a plurality of data conversion stages, each stage receiving a given block of the data values and producing a corresponding cipher block for the given stage; and
a last stage of the first cipher block chaining algorithm produces the intermediate message authentication code block for each sub-set of blocks.

14. The apparatus of claim 13, further comprising: a plurality of processors, each processor operable to execute at least one stage of the first cipher block chaining algorithm as a pipeline.

15. The apparatus of claim 14, wherein the processors operate in parallel.

16. The apparatus of claim 13, wherein the at least one processor is operable to:
execute a first stage of the first cipher block chaining algorithm by performing an encryption algorithm on the given block of data values to produce the corresponding cipher block; and
execute subsequent stages of the first cipher block chaining algorithm by performing an exclusive OR operation using the cipher block of the previous stage and the given block of data values followed by an encryption algorithm to produce the corresponding cipher block for the given stage.

17. The apparatus of claim 16, further comprising: a plurality of processors, each processor operable to execute one of the stages of the first cipher block chaining algorithm as a pipeline.

18. The apparatus of claim 13, wherein:
the second cipher block chaining algorithm includes a plurality of data conversion stages, each stage receiving a given one of the intermediate message authentication code blocks and producing a corresponding cipher block for the given stage; and
a last stage of the second cipher block chaining algorithm produces the message authentication code block for the plurality of blocks.

19. The apparatus of claim 18, wherein the at least one processor is operable to:
execute a first stage of the second cipher block chaining algorithm by performing an encryption algorithm on the given block of data values to produce the corresponding cipher block; and
execute subsequent stages of the second cipher block chaining algorithm by performing an exclusive OR operation using the cipher block of the previous stage and the given intermediate message authentication code block followed by an encryption algorithm to produce the corresponding cipher block for the given stage.

20. The apparatus of claim 12, wherein the first and second cipher block chaining algorithms are the same.

21. A non-transitory computer readable storage medium containing a software program operable to cause a processor to perform actions, comprising:
dividing a quantity of data values into a plurality of blocks;
dividing the plurality of blocks into respective sub-sets of blocks;
computing an intermediate message authentication code block for each sub-set of blocks by performing a first cipher block chaining algorithm on the blocks of each sub-set of blocks; and
computing a message authentication code block for the plurality of blocks by performing a second cipher block chaining algorithm on the intermediate message authentication code blocks.

22. The storage medium of claim 21, wherein:
the first cipher block chaining algorithm includes a plurality of data conversion stages, each stage receiving a given block of the data values and producing a corresponding cipher block for the given stage; and
a last stage of the first cipher block chaining algorithm produces the intermediate message authentication code block for each sub-set of blocks.

23. The storage medium of claim 22, further comprising executing each stage of the first cipher block chaining algorithm in a separate pipeline.

24. The storage medium of claim 22, wherein:
a first stage of the first cipher block chaining algorithm performs an encryption algorithm on the given block of data values to produce the corresponding cipher block; and
subsequent stages of the first cipher block chaining algorithm each perform an exclusive OR operation using the cipher block of the previous stage and the given block of data values followed by an encryption algorithm to produce the corresponding cipher block for the given stage.

25. The storage medium of claim 24, further comprising executing each stage of the first cipher block chaining algorithm in a separate pipeline.

26. The storage medium of claim 22, wherein:
the second cipher block chaining algorithm includes a plurality of data conversion stages, each stage receiving a given one of the intermediate message authentication code blocks and producing a corresponding cipher block for the given stage; and
a last stage of the second cipher block chaining algorithm produces the message authentication code block for the plurality of blocks.

27. The storage medium of claim 26, wherein:
a first stage of the second cipher block chaining algorithm performs an encryption algorithm on the given block of data values to produce the corresponding cipher block; and
subsequent stages of the second cipher block chaining algorithm each perform an exclusive OR operation using the cipher block of the previous stage and the given intermediate message authentication code block followed by an encryption algorithm to produce the corresponding cipher block for the given stage.

28. The storage medium of claim 21, wherein the first and second cipher block chaining algorithms are the same.

29. A non-transitory computer readable storage medium containing a software program operable to cause a processor to perform actions, comprising:
dividing a quantity of data values into a plurality of blocks;
dividing the plurality of blocks into respective sets of blocks;
dividing each set of blocks into respective sub-sets of blocks;
computing an intermediate message authentication code block for each sub-set of blocks by performing a first cipher block chaining algorithm on the blocks of each sub-set of blocks; and
computing a message authentication code block for the plurality of blocks by performing a second cipher block chaining algorithm on the intermediate message authentication code blocks.

30. The storage medium of claim 29, wherein:
the first cipher block chaining algorithm includes a plurality of data conversion stages, each stage receiving a given block of the data values and producing a corresponding cipher block for the given stage; and
a last stage of the first cipher block chaining algorithm produces the intermediate message authentication code block for each sub-set of blocks.

31. The storage medium of claim 30, further comprising executing each stage of the first cipher block chaining algorithm in a separate pipeline.

* * * * *